United States Patent [19]

Bassner

[11] Patent Number: 5,670,599
[45] Date of Patent: Sep. 23, 1997

[54] ULTRA LOW VOC POLYURETHANE COATINGS

[75] Inventor: Sherri Lynn Bassner, Bethlehem, Pa.

[73] Assignee: Air Products and Chemicals, Inc., Allentown, Pa.

[21] Appl. No.: 400,910

[22] Filed: Mar. 8, 1995

[51] Int. Cl.⁶ .................................................. C08G 18/10
[52] U.S. Cl. .................... 528/59; 252/182.22; 521/159
[58] Field of Search ................... 252/182.22; 528/59; 521/159

[56] References Cited

U.S. PATENT DOCUMENTS

| | | | |
|---|---|---|---|
| 3,218,348 | 11/1965 | McElroy et al. | 560/26 |
| 3,384,624 | 5/1968 | Heiss | 521/159 |
| 3,726,825 | 4/1973 | Woodward et al. | 528/59 |
| 5,115,071 | 5/1992 | Quay et al. | 528/59 |
| 5,208,334 | 5/1993 | Potter et al. | 544/193 |
| 5,243,011 | 9/1993 | Panandiker et al. | 528/45 |
| 5,250,650 | 10/1993 | Boretzky et al. | 528/67 |

*Primary Examiner*—Rachel Gorr
*Attorney, Agent, or Firm*—Russell L. Brewer; William F. Marsh

[57] ABSTRACT

This invention relates to improved two part, low VOC polyurethane coatings comprising a low viscosity polyisocyanate component having an isocyanate functionality greater than two and a polyol component having a functionality equal to or greater than two. The improvement resides in the utilization of a unique isocyanate component in the two part polyurethane coating formulation. The isocyanate component comprises said low viscosity polyisocyanate component and an isocyanate terminated or end capped prepolymer formed by the reaction of a diisocyanate and a multifunctional polyol, the prepolymer having at least about 85 preferably 90 percent by weight of a 2:1 adduct of isocyanate to polyol (NCO/OH) and less than about 1 and preferably less than about 0.5% by weight of residual diisocyanate monomer therein.

7 Claims, 1 Drawing Sheet

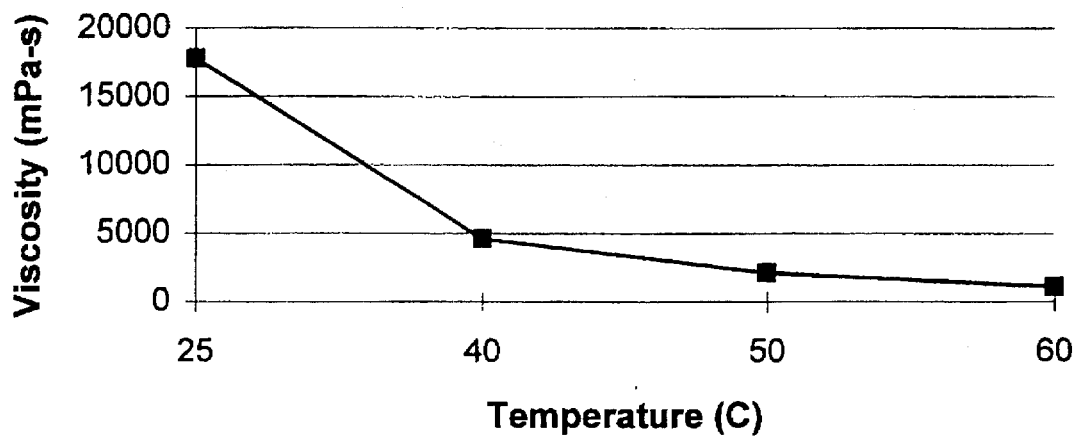
Figure 1: Thermal Profile for 100% Solids Isocyanate Component
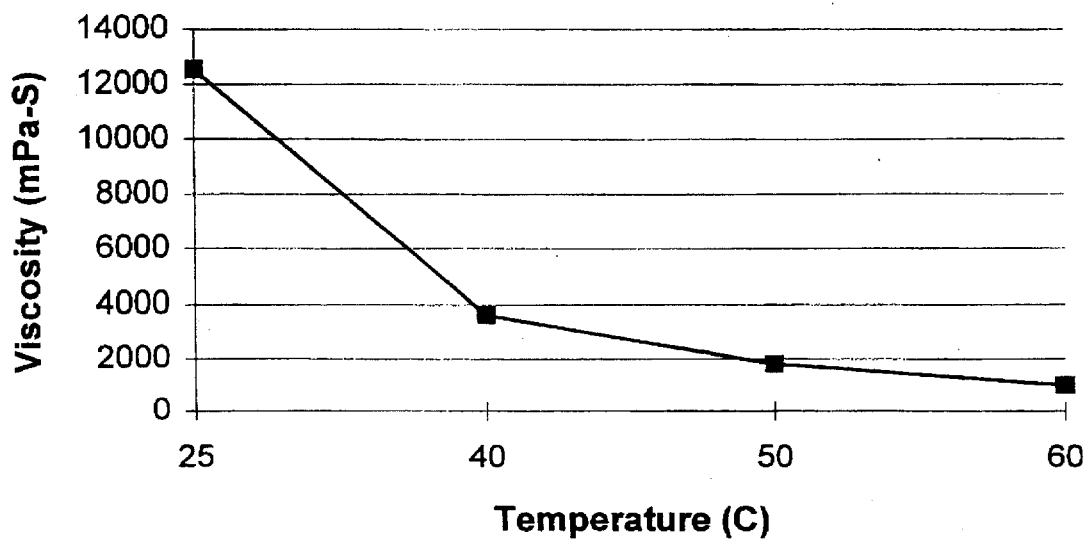
Figure 2: Thermal Profile for Low VOC Pigmented/ Polyol Grind

ULTRA LOW VOC POLYURETHANE COATINGS

TECHNICAL FIELD OF THE INVENTION

This invention relates to polyurethane systems comprising a mixture of low viscosity polyurethane prepolymers with polyisocyanate crosslinkers and to the coatings prepared therefrom.

BACKGROUND OF THE INVENTION

Two part solvent-based polyurethane coatings systems utilizing aliphatic isocyanates and polyester or acrylic polyols have become the industry standard for weatherable topcoats. These coatings systems combine exceptional resistance to chemical and physical damage with high gloss levels and long term retention of gloss, color and mechanical properties. Traditionally, these coatings systems have been formulated with low viscosity, high functionality liquid polyisocyanate crosslinkers as one component and a high molecular weight, high functionality polyol and associated pigments and additives as the second component.

A major driving force in the reformulation of coatings the world over is the need to reduce solvent emissions. One disadvantage of these traditional polyurethane formulations toward reformulation is the high solvent demand of the polyol component. This factor has limited the volatile organic content (VOC) reduction available with traditional polyol systems. One route to lowering VOC has been to employ lower molecular weight polyols. As formulators have incorporated more and more lower molecular weight (lower viscosity) polyols or reactive diluents, such as low molecular weight hydroxy acrylics or blocked systems such as oxazolidines, into their systems, there has been an inevitable trade-off in physical properties of the resulting low VOC coatings and/or in the handling of the reactive mixture. For example, many of the low VOC polyurethane coatings suffer from poor solvent resistance, poor flexibility, and an extreme sensitivity to catalyst level and its effect on cure profile.

As polyurethane coating formulators have reduced the volatile organic content (VOC) of their formulations, they have found it increasingly difficult to maintain good handling characteristics and mixing ratios. Traditionally, low VOC coatings tend to exhibit very short pot lives (1 h or less), a high sensitivity to the level of added catalyst, and the formulations often require mix ratios of pigmented polyol to isocyanate of from 3.5 to 6:1. Formulators are looking for ways to control the reactivity of their systems more efficiently and attain more attractive mixing ratios, preferably 1:1, while continuing to lower VOC toward zero.

Concurrent with the drive toward lower and lower VOC for conventionally applied coatings, formulators and applicators have also increased the use of plural component application equipment. This type of equipment has been used for many years to apply 100% reactive, fast reacting polyurethane coatings for thick film linings and for adhesives and sealants. With this equipment, the reactive components are heated to generate a lower viscosity component, metered into a chamber designed to rapidly mix the components and then pumped to a traditional airless or air-assisted airless gun for application.

Representative patents pertaining to polyurethane coating formulations and their use as coatings are as follows:

U.S. Pat. No. 3,218,348 discloses a process for preparing polyurethane polyisocyanates which have high molecular weight and do not crystallize from a solution on standing. The polyisocyanates are reacted with a trihydric alcohol such as trimethylolpropane in an organic solvent followed by addition of a dihydric alcohol such as 1,3-butyleneglycol.

U.S. Pat. No. 3,384,624 discloses a process for preparing polyurethane prepolymers free of unreacted polyisocyanate. The prepolymers, which can be used for preparing coatings, castings, paints and lacquers, are prepared by reacting toluenediisocyanate with an active hydrogen containing compound, e.g. a long chain diol and then contacting the prepolymer with a phenolic material in an amount sufficient to remove excess unreacted polyisocyanate. Mole ratios of polyisocyanate to diol range from about 1.3 to 2.1. The resulting blocked polyurethane prepolymer then can be unblocked and chain extended with an organic diamine or polyol.

U.S. Pat. No. 3,726,825 discloses polyurethane coatings having moisture vapor barrier properties as well as high gloss, abrasion resistance, etc. required of such coatings. The linear thermoplastic polyurethane resins are prepared by reacting a non-halogenated organic diisocyanate with an organic dihydroxy compound and from about 0.1 to 0.9 moles of neopentylglycol. The resulting polyurethane prepolymer then is cured under anhydrous conditions.

U.S. Pat. No. 5,208,334 discloses a process for the production of a low viscosity isocyanurate system containing isocyanurate and allophanate groups by catalytically trimerizing a portion of the isocyanate groups, adding a monoalcohol to the organic diisocyanate prior to or during the trimerization reaction and terminating the trimerization by adding a catalyst poison. The unique isocyanurates overcome two problems associated with isocyanates containing isocyanurate groups, one relating to viscosity thereby permitting reduced solvent in the coating formulation and the other relating to incompatibility with the polyol.

U.S. Pat. No. 5,115,071 discloses high performance coating compositions which are based upon the reaction of a prepolymer having a low oligomer content and a polyol. More specifically, the prepolymer is an end capped prepolymer which is formed by the reaction of a diisocyanate and a multifunctional polyol, the prepolymer having at least about 85 preferably 90 percent by weight of a 2:1 adduct of isocyanate to polyol (NCO/OH) and less than about 1 and preferably less than about 0.5% by weight of residual diisocyanate monomer therein.

SUMMARY OF THE INVENTION

This invention relates to improved two part, low VOC polyurethane coatings comprising a low viscosity polyisocyanate crosslinker component having an isocyanate functionality greater than two and a polyol component having a functionality equal to or greater than two. The improvement resides in the utilization of a unique isocyanate component in the two part polyurethane coating formulation. The isocyanate component comprises said low viscosity polyisocyanate crosslinker and an isocyanate terminated or end capped prepolymer formed by the reaction of a diisocyanate and a multifunctional polyol, the prepolymer having at least about 85 preferably 90 percent by weight of a 2:1 adduct of isocyanate to polyol (NCO/OH) and less than about 1 and preferably less than about 0.5% by weight of residual diisocyanate monomer therein.

There are several advantages associated with the utilization of the unique isocyanate component for the low VOC coating composition and these include:

an ability to employ spray application technology which allows the use of elevated temperatures to reduce formulation viscosity without concerns over the working life of the formulation and yet achieve desirable dry times;

an ability to reduce or eliminate the need for solvent and thus produce low or near zero VOC polyurethane topcoats for high performance applications and to produce low VOC polyurethane primer coats;

an ability to decrease worker exposure potential due to lower volatility and reduced isocyanate toxicity systems through the use an isocyanate component comprising in part a prepolymer having a very narrow molecular weight distribution with very low residual diisocyanate monomer;

an ability to formulate and apply the coating formulation at or near to a 1:1 volume ratio; and an ability to produce polyurethane coatings having excellent physical properties such as tensile strength, scratch and solvent resistance.

DRAWINGS

FIG. 1 is a plot showing a view of viscosity profile verses temperature for a 100% solids isocyanate component.

FIG. 2 is a plot showing a view of viscosity profile verses temperature for a low VOC pigmented/polyol grind.

DETAILED DESCRIPTION OF THE INVENTION

The standard procedure for preparing low VOC 2-part polyurethane coatings involves the use of a low viscosity polyisocyanate crosslinker and a high functionality, high molecular weight polyol component. Traditional low viscosity polyisocyanate crosslinker components having a functionality greater than two include isocyanurates, biurets, uretdiones and allophanates. Isocyanurates are formed by the trimerization of aliphatic or aromatic diisocyanates. Trimerization is effected by reacting 3 moles of the diisocyanate with itself or another polyisocyanate to produce a single isocyanurate ring. Phosphines, Mannich bases and tertiary amines, such as 1,4-diazabicyclo[2.2.2]octane dialkyl piperazines, etc. can be used as trimerization catalysts. The biurets are formed via the addition of a small amount of water to two moles isocyanate and reacting at slightly elevated temperature in the presence of a catalyst. The uretdione is formed by the dimerization of the isocyanate. Allophanates are prepared by the reaction of the diisocyanate with a urethane bond. Another class of isocyanates which may be used are isocyanate adducts of low molecular weight polyols. These adducts are formed by the reaction of a low molecular weight polyol, e.g., a triol such as trimethylolpropane and polyether triols such as ethylene oxide and propylene oxide triols with the diisocyanate.

Representative diisocyanates useful in the synthesis of isocyanurate, biurets, uretdiones and adducts of diisocyanates described above, which are then utilized as one of the constituents in the 2 part polyurethane coating formulation, include conventional aliphatic and aromatic diisocyanates. These diisocyanates which may be used alone or mixed include 1,4-tetramethylene diisocyanate, 1,6-hexamethylene diisocyanate (HDI), 2,2,4-trimethyl-1,6-hexamethylene diisocyanate, 1,12-dodecamethylene diisocyanate, 1-isocyanato-3-isocyanatomethyl-3,5,5-trimethyl-cyclohexane (isophorone diisocyanate or IPDI), tetramethylxylyl diisocyanate (TMXDI), bis(4-isocyanatocyclohexyl)methane ($H_{12}MDI$), and bis(4-isocyanato*3-methyl-cyclohexyl)methane. Aromatic diisocyanates may also be used in formulating the isocyanate component. They may be mixed with the aliphatic diisocyanate or used by themselves in generating the isocyanate component. The aromatic diisocyanates suffer from UV sensitivity and thus are not preferred for the formulation of weatherable topcoats. On the other hand the aromatic diisocyanates may be blended with the aliphatic diisocyanate component or used alone to enhance chemical resistance, the rate of reaction, etc. Examples of aromatic diisocyanates include toluenediisocyanate (TDI), bis(4-isocyanatophenyl) methane (MDI) and the like.

The second part of the unique isocyanate component for preparing the low VOC polyurethane coatings is a diisocyanate prepolymer having an equivalent weight between 250 and 2000 (preferably between 350 and 1000) grams per equivalent. The prepolymers are formed generally by reacting an aliphatic or aromatic diisocyanate with a polyol or mixture of polyols having an average functionality greater than 2 (generally in the range of from 2.2 to 4) and average equivalent weight generally in the range of 200 to 1000 g/eq. An excess of diisocyanate is reacted with the polyol component at an equivalent ratio of greater than 4:1 equivalents NCO per equivalent OH in the polyol to produce a reaction product having at least 85 preferably 90% by weight of a 2:1 NCO/OH adduct of isocyanate to polyol. The unreacted diisocyanate monomer is removed from the prepolymer by distillation or other treatment to a concentration of less than 1% and preferably less than 0.5% of unreacted diisocyanate. Representative diisocyanates that can be used for producing the prepolymers include the above aliphatic and aromatic diisocyanates.

Conventional long chain polyols are used to produce the isocyanate terminated prepolymers. These include di- or multi-functional alkylene ether polyols such as poly (tetramethyleneglycol, PTMG) polyols; poly(propylene oxide) polyols; and poly(ethylene oxide) polyols. Polyether polyols may also comprise ethylene oxide or propylene oxide adducts of polyols such as the ethylene and propylene oxide adducts of ethylene or butylene glycol. Although not a polyol per se, polycaprolactone acts similarly to a polyether polyol and may be utilized. Polyester polyols such as those formed by the reaction of aliphatic or aromatic dicarboxylic acids with glycols can also be used as the polyol component for preparing the polyurethane prepolymers. Specific examples of acids for forming polyester polyols include isophthalic, terephthalic, and adipic acids. Specific glycols include ethylene glycol, diethylene glycol, butanediol, propylene glycol neopentyl glycol and hexane diol and so forth. Acrylic polyols may also be used as a polyol component. In addition to the conventional polyols recited above, polyols having a functionality greater than 2 can be blended with a long chain diol to produce a polyol component for reaction with the polyisocyanate in an amount such that the average functionality is greater than 2 and preferably between 2.2 and 4 and the average equivalent weight is between 100 and 2000. Representative short chain multifunctional polyols having functionality greater than 2 include trimethylolpropane (TMP), glycerol, pentaerythritol, dipentaerythritol, trihydroxybutane, sucrose, and alkoxylated or esterified adducts of the above.

The low oligomer isocyanate terminated prepolymers utilized in forming the isocyanate component can be prepared by reacting the multi-functional polyol composition with a large (greater than 4 to 1 and typically from 6-10:1) equivalent excess of the diisocyanate to polyol. The prepolymers essentially comprise two equivalents diisocyanate per equivalent of polyol because of the high ratio of diisocyanate to polyol in the original reaction mixture. Excess diisocyanate is removed to levels less than 1% preferably less than 0.5% by weight in the prepolymer. Temperatures for effecting reaction between the diisocyanate and polyol are conventional, e.g., 0°–120° C. Care should be exercised during removal of the excess diisocyanate so that allophanates, oligomers and other byproducts are not formed. Further description and/or examples are described in U.S. Pat. No. 5,115,071 and the subject matter of that patent is incorporated by reference.

The isocyanate component of the low VOC coatings is prepared by blending the isocyanate-terminated prepolymer with the low viscosity polyisocyanate crosslinker(s), such as the isocyanurate of hexamethylene diisocyanate (HDI trimer) and/or HDI uretdione, as well as other isocyanurates, uretdiones, biurets,, allophanates, or low molecular weight polyol adducts of HDI, IPDI, $H_{12}$MDI, TMXDI, TDI and MDI in a weight ratio ranging from 10:90 to 90:10 prepolymer to low viscosity polyisocyanate(s). Preferably the blend weight ratio is from about 40:60 to 60:40 based on a total weight of 100 weight parts allowing easy formulating of 1:1 mix ratio. In contrast, conventional systems based on a mixture of pigment and acrylic polyol and cured with a polyisocyanate crosslinker, for example, typically exhibit mix ratios pigmented/polyol to the isocyanate component of 2.5 to 6:1

The higher level of partially reacted prepolymer helps to moderate the high reactivity of the low viscosity, high functionality polyisocyanate allowing greater control over reactivity and it is less sensitive to catalyst level variations, particularly at higher (>23° C.) application temperatures. With better control over the cure speed of the film, one can achieve better film appearance. These systems may be formulated such that the reacting components are at similar viscosities thereby enhancing the ease of mixing particularly for meter-mix-dispense type applicators. A conventionally prepared prepolymer, if used in this blend, would require large amounts of solvent to attain sufficient application viscosity. High molecular weight oligomers in these conventional prepolymers not only increase the solvent demand of the formulation, but also lead to shorter pot lives because of rapid molecular weight build.

A retrospective look at compositional analysis helps to illustrate the above points. First, by using a "pre"-polymer of the type utilized herein, diisocyanate monomer content is reduced and the reactivity of this partially reacted system is simpler to control. Second, casual inspection of traditional prepolymer compositions which have from 55 to 60% of a 2:1 adduct, 35–45% oligomer content having isocyanate to polyol ratios of 3:2, 4:3 and 5:4 and a residual isocyanate monomer content of 2–4% by weight now helps to explain why conventional prepolymers have seen limited use in higher solids coatings formulations. In contrast, an examination of the composition of the prepolymers employed here, having from 85 to about 95% of a 2:1 adduct, a low oligomer content of from 5 to 15% and <1% and preferably <0.5% by weight residual isocyanate monomer content shows why the combination of this prepolymer with the low viscosity polyisocyanate offers some of the observed improvements.

Solvents can be added to the formulation to achieve desired viscosity. Obviously, one would prefer to use as little solvent as possible in producing these low VOC coatings. Typical solvents which can be used include but are not limited to xylene, toluene, methylethylketone, methylamylketone, ethylacetate, tetrahydrofuran, and n-butylacetate.

Conventional catalysts used to accelerate the reaction between the isocyanate component and the polyol component may be incorporated into the formulation. Example of catalysts include metal based compositions, such as dibutyl tin dilaurate and zinc carboxylate.

The following examples are intended to represent various embodiments and are not intended to restrict the scope thereof.

EXAMPLES 1 and 1A Prior Art Isocyanurate of Hexamethylene Diisocyanate/Acrylic Polyol Polyurethane coating Formulation A conventional polyisocyanate/acrylic polyol coating composition was prepared in a conventional manner. First, the pigmented polyol mix was prepared and then blended with the isocyanate component. The formulation is shown in Table 1 and 2.

A second sample, 1 A, was prepared using the same formulation as Example 1 except that the Dabco and Mooney catalysts were omitted from the formulation. One of the problems associated with the Example 1 formulation was that the pot life was so short there was barely enough time to handle the polyisocyanate/acrylic polyol coating composition after formulation. Thus, Example 1 was repeated as Example 1A except the catalyst was eliminated in order to extend pot life.

TABLE I

| Raw Material | Component | Eq. Wt. | % Solids | Supplied. lb./gal | Solvent lb./gal |
| --- | --- | --- | --- | --- | --- |
| Chempol 17-3855 | acrylic polyol | 637.50 | 80 | 8.70 | 7.26 |
| Zoldine RD-4 | oxazolidine | 89.30 | 100 | 7.57 | 0.00 |
| Ti-Pure R-960 | TiO$_2$ pigment | 0.00 | 100 | 33.20 | 0.00 |
| Nuosperse 657 | pigment | 0.00 | 70 | 7.90 | 6.55 |

TABLE I-continued

| Raw Material | Component | Eq. Wt. | % Solids | Supplied lb./gal | Solvent lb./gal |
|---|---|---|---|---|---|
| | dispersant | | | | |
| TEGO 980 | air release agent | 0.00 | 100 | 7.95 | 0.00 |
| TINUVIN 384 | UV adsorber | 0.00 | 95 | 8.81 | 7.26 |
| Tinuvin 292 | hindered amine light stabilizer | 0.00 | 100 | 8.34 | 0.00 |
| DABCO 120 | tin (IV) catalyst | 0.00 | 100 | 8.33 | 0.00 |
| MOONEY 18% Zn | zinc carboxylate catalyst | 0.00 | 84 | 8.77 | 7.26 |
| DISLON NS-30 | pigment anti-settling agent | 0.00 | 15 | 7.36 | 7.26 |
| Methyl amyl ketone | | 0.00 | 0 | 6.80 | 6.80 |
| Desmodur N-3300 | HDI isocyanurate | 195.00 | 100 | 9.70 | 0.00 |

TABLE 2

| Pigmented Polyol Component | Weight lb. | Volume Gallons | Weight Solids lb. | Volume Solids Gallons |
|---|---|---|---|---|
| Chempol 17-3855 | 339.28 | 39.00 | 271.43 | 29.65 |
| Zoldine RD-4 | 67.86 | 8.96 | 67.86 | 8.96 |
| Ti-Pure R-960 | 400.68 | 12.07 | 400.68 | 12.07 |
| Nuosperse 657 | 4.40 | 0.56 | 3.08 | 0.36 |
| TEGO 980 | 4.32 | 0.54 | 4.32 | 0.54 |
| TINUVIN 384 | 9.73 | 1.10 | 9.25 | 1.04 |
| Tinuvin 292 | 9.25 | 1.11 | 9.25 | 1.11 |
| DABCO 120 | 0.31 | 0.04 | 0.31 | 0.04 |
| MOONEY 18% Zn | 3.67 | 0.42 | 3.08 | 0.34 |
| DISLON NS-30 | 1.64 | 0.22 | 0.25 | 0.03 |
| Methyl amyl ketone | 50.35 | 7.40 | 0.00 | 0.00 |
| Total | 891.49 | 71.42 | 769.51 | 54.14 |
| Isocyanate | 277.15 | 28.57 | 277.15 | 28.71 |
| Component II: Desmodur N-3300 | | | | |
| Total | 1168.64 | 100.00 | 1046.64 | 82.71 |

Weight Solids, % = 89.56
Volume Solids, % = 82.71
P/B Ratio (pigment/binder) = 0.65
PVC, % pigment/volume content = 115.23
Weight/gallon = 11.69
NCO:OH Ratio = 1.10
Mix Ratio = 2.50
VOC, lbs/gal = 1.22

EXAMPLES 2 Prior Art 2:1 Prepolymer/Polyol Weatherable Coating Formulation and Coating Performance A high solids formulation for weatherable applications based on acrylic polyols is shown. The formulation is detailed in Table 3. The isocyanate prepolymer of this formulation is a commercial prepolymer sold under the trademark Airthane® ASN-540M, based on isophorone diisocyanate (IPDI) and a mixture of neopentyl glycol adipates. The prepolymer had been prepared to have a reacted 2:1 NCO/OH ratio and a residual diisocyanate monomer content of less than 0.5% by weight. More specifically, the prepolymer had a nominal equivalent weight of 540 g/eq (on solids) and an average functionality of about 2.5. It is used in this formulation as an 85% solids solution in methyl amyl ketone (MAK). The oligomer content is less than 15% by weight of the prepolymer. This formulation is delivered at a 1:1 volume mix ratio of prepolymer to polyol in conventional plural component application equipment.

TABLE 3

Typical formulation for high solids weatherable polyurethane topcoat

| Material | Weight (%) | Volume (%) | Supplier | Comments |
|---|---|---|---|---|
| Polyol Component Mix | | | | |
| Chempol 17-3855 | 21.02 | 27.84 | CCP | acrylic polyol |
| Zoldine RD4 | 1.87 | 2.84 | Angus | oxazolidine reactive diluent |
| Ti-Pure R960 | 33.36 | 11.58 | DuPont | $TiO_2$ pigment |
| Disperbyk 110 | 1.58 | 2.14 | Byk-Chemie | pigment dispersant |
| Dislon NS-30 | 0.14 | 0.21 | King Industries | pigment anti-settling agent |
| Tinuvin 292 | 0.77 | 1.06 | Ciba-Geigy | hindered amine light stabilizer |
| Tinuvin 400 | 0.91 | 1.26 | Ciba-Geigy | UV adsorber |
| Tego 980 | 0.36 | 0.52 | Tego Chemie | air release agent |
| DABCO 120 | 0.05 | 0.07 | Air Products | tin (IV)catalyst |
| 18% Zn-Oct | 0.31 | 0.40 | OMG | zinc carboxylate catalyst |

TABLE 3-continued

Typical formulation for high solids weatherable polyurethane topcoat

| Material | Weight (%) | Volume (%) | Supplier | Comments |
|---|---|---|---|---|
| MAK | 1.21 | 2.05 | | methyl amyl ketone |
| Subtotal Isocyanate Component | 61.58 | 49.97 | | |
| Airthane | 38.42 | 50.03 | Air-Products | isocyanate prepolymer |
| ASN-540M | | | | |
| Total | 100.00 | 100.00 | | |

Weight solids = 87.76%; Volume solids = 79.94%; PVC = 15.27%; VOC = 169 g/L (1.41 lb./gal); Mix Ratio: 1:1

EXAMPLE 3 2:1 Prepolymer and Isocyanurate Blend Weatherable Coating Formulation and Coating Performance A high solids formulation for weatherable applications based on acrylic polyols and similar to Example 2 is shown. The formulation is detailed in Table 4. The isocyanate component consisted of an isocyanurate of hexamethylene diisocyanate blended with a prepolymer. The prepolymer is a commercial prepolymer sold under the trademark Airthane® ASN-540M based on isophorone diisocyanate (IPDI) and a mixture of neopentyl glycol adipates. The weight ratio of isocyanurate to prepolymer was 20/80. This formulation is delivered at a 1:1 volume mix ratio of prepolymer/isocyanurate blend to polyol in conventional plural component application equipment.

TABLE 4

| Raw Material Component 1: | Weight | Volume | Weight Solids | Volume Solids |
|---|---|---|---|---|
| Chempol 17-3855 | 234.36 | 26.94 | 187.49 | 20.48 |
| Zoldine RD-4 | 46.87 | 6.19 | 46.87 | 6.19 |
| Ti-Pure R-960 | 408.75 | 12.31 | 408.75 | 12.31 |
| Nuosperse 657 | 6.29 | 0.80 | 4.40 | 0.51 |
| TEGO 980 | 4.40 | 0.55 | 4.40 | 0.55 |
| TINUVIN 384 | 9.93 | 1.13 | 9.43 | 1.06 |
| Tinuvin 292 | 9.43 | 1.13 | 9.43 | 1.13 |
| DABCO 120 | 0.31 | 0.04 | 0.31 | 0.04 |
| MOONEY 18% Zn | 3.74 | 0.43 | 3.14 | 0.34 |
| DISLON NS-30 | 1.68 | 0.23 | 0.25 | 0.03 |
| Total | 725.76 | 49.75 | 674.47 | 42.64 |
| Isocyanate Component II: | 371.28 | 41.95 | 315.59 | 33.76 |
| AIRTHANE ASN-540M Desmodur N-3300 | 78.90 | 8.31 | 78.90 | 8.31 |
| Total | 1175.95 | 100.00 | 1068.98 | 84.72 |

Weight Solids, % = 90.90
Volume Solids, % = 84.72
Weight/gallon = 11.76
NCO:OH Ratio = 1.10
P/B Ratio = 0.65
Mix Ratio = 0.99
PVC, % = 15.19
VOC, lb./gal = 1.07

EXAMPLE 4 Physical and Mechanical Test

Physical and mechanical tests were performed on samples prepared from Examples 1, 1A, 2 and 3. The results are set forth in Table 5.

TABLE 5

PROCESSING, PHYSICAL AND MECHANICAL PROPERTIES

| Test | Example 1 | Example 1A No Cat | Example 2 | Example 3 |
|---|---|---|---|---|
| Dry Times (hr.) | | | | |
| STT | 0.5 | 1 | 3 | 0.5 |
| TF | 0.5 | 12 | 10 | 2 |
| TC | 0.5 | 13.5 | 16 | 3.5 |
| DFT (mils) | 2.5 | 2.6 | 2.5 | 2.3 |
| Gloss | | | | |
| 20 | 87.9 | 86.7 | 84.7 | 85 |
| 60 | 95 | 93.9 | 92.6 | 93.2 |
| 85 | 97.2 | 96.6 | 97.6 | 96.4 |
| Hardness | | | | |
| Persoz (s) | 110 | 112 | 56 | 98 |
| Pencil (gouge) | HB | HB | HB | HB |
| Adhesion | | | | |
| x-hatch dry | 4B | 4B | 4B | 4B |
| x-cut dry | 4A | 4A | 5A | 4A |
| x-cut, 24 hr wet | 4A | 4A | 3-4A | 4A |
| Scratch (g) | 1800 | 2000 | | 1500 |
| Impact D/R (in-LB) | 160/140 | 160/120 | 160/160 | 160/160 |
| Chem 24 Spot | | | | |
| NaOH 10% | 4 | 4 | 3 | 4 |
| HCl 10% | S2 | 4 | 0 | 4 |
| HNO3 35% | S2 | 4 | 1 | 1 |
| xylene | 2 | 2 | 1,2 | 2 |
| MEK | 2 | 2 | 0 | 0 |
| IPA | 2 | 2 | 2 | 2 |
| MEK rubs | 100+ | 100+ | 100+ | 100+ |
| comments | sl soft | sl soft | soft, burnish | soft, burnish |

STT = set to touch, TF = tack free, and TC = through cure; Chem spot-0 = delaminated, 1 = blistered, 2 = softened, 3 = discolored, and 4-no detectable discoloration, sl = slightly.

Although not reported the pot life of Examples 2 and 3 was estimated to be about 1 to 1.5 hours. Surprisingly, although the pot lives were essentially the same, the rate of cure of the 80/20 prepolymer/isocyanurate ratio was much greater. The TF and TC values for the Example 3 formulation were much lower than the Example 2 formulation and lower than the non catalyzed Example 1A formulation. The effect of the isocyanurate addition to the prepolymer blend is also noted in the Persoz hardness. A small amount of isocyanurate increased the Persoz hardness from 56 to 98; the 100% isocyanurate level utilized in Example 1 and 1 A was only slightly higher. Chemical resistance was also enhanced by the utilization of the prepolymer/isocyanurate blend in that total delamination in 10% HCl occurred for the Example 2 formulation while excellent results were obtained with the blend used in Example 3. Resistance to alkali and aromatic solvents was also better.

EXAMPLE 5 Prepolymer/Isocyanurate Blend with Polyester Polyol

A formulation similar to Example 3 was prepared with the exception that the isocyanate component consisting of the Airthane prepolymer, an isocyanurate of hexamethylene diisocyanate, and the uretdione of hexamethylene diisocyanate, contained no solvent, the blend weight ratio of the mixture of prepolymer and the mixture of isocyanurate and uretdione was 50/50 and the polyol component was based on a polyester/polycaprolactone polyol mixture as opposed to the acrylic polyol. It was formulated at less than 24 g/L (0.20 lb./gal). A typical formulation is detailed in Table 6. Viscosity profiles versus temperature for the isocyanate and polyol components are shown in FIGS. 1 and 2, respectively.

TABLE 6

Typical Formulation for Low VOC Topcoat

| Material | Weight (%) | Volume (%) | Supplier | Comments |
|---|---|---|---|---|
| Polyol/Pigment Component I | | | | |
| Chempol 18-2244 | 15.00 | 20.11 | CCP | polyester polyol |
| Tone 0301 | 6.43 | 9.10 | Union Carbide | solvent-free caprolactone-based polyol |
| Ti-Pure R960 | 37.77 | 14.57 | DuPont | pigment |
| Disperbyk 110 | 1.68 | 2.52 | Byk-Chemie | dispersant |
| Dislon NS-30 | 0.16 | 0.27 | King Industries | thixotrope |
| Tinuvin 292 | 0.58 | 0.89 | Ciba-Geigy | HALS |
| Tinuvin 400 | 0.68 | 1.06 | Ciba-Geigy | UV stabilizer |
| Tego 980 | 0.29 | 0.47 | Tego Chemie | air release |
| Byk 320 | 0.33 | 0.61 | Byk-Chemie | flow aid |
| DABCO 120 | 0.03 | 0.04 | Air Products | catalyst |
| 18% Zn-Oct | 0.35 | 0.51 | OMG | zinc catalyst |
| Subtotal Isocyanate | 63.30 | 50.15 | | |

TABLE 6-continued

Typical Formulation for Low VOC Topcoat

| Material | Weight (%) | Volume (%) | Supplier | Comments |
|---|---|---|---|---|
| Component II | | | | |
| Airthane ASN-540 | 18.36 | 25.38 | Air Products | isocyanate prepolymer |
| Desmodur N3300 | 9.17 | 12.12 | Miles/Bayer | HDI isocyanurate |
| Luxate HD-100 | 9.17 | 12.35 | Olin | HDI uretdione |
| Subtotal | 36.70 | 49.85 | | |
| Totals | 100.00 | 100.00 | | |

Weight solids = 98.74%; Volume solids = 97.94%; PVC = 15.57%; VOC = 19 g/L (0.16 lb./gal); Mix Ratio: 1:1

Note the low VOC level in the formulation. It is about one-tenth that of Example 3 which is about 50% lower than a standard isocyanurate based polyurethane coating system.

The use of the low oligomer prepolymer is critical to the success of this mixture. A conventional prepolymer would have too high a viscosity and most likely impart poor sprayability to the formulation. Note, again, that the materials have very similar viscosities at an application temperature of 60° C. The fact that these components have similar viscosity profiles means, in part that the isocyanate and polyol can be easily mixed at the 1:1 ratio. What is also surprising about the viscosity profiles is that the formulations were essentially at zero VOC, yet the two components have very similar viscosities. Usually, with conventional systems, as solvent is reduced to very low levels, viscosity differences increase dramatically, an undesirable result which is avoided through the isocyanate component described herein.

EXAMPLE 6 Physical And Mechanical Property Comparisons Of Formulations 1 And 2

Physical and mechanical property comparisons of the formulations in Examples 1A, 3 and 5 were made. The results are shown in Table 7.

TABLE 7

Representative Film Property Comparison

| Property | Example 1 A Isocyanurate/ Acrylic Polyol | Example 3 Prepolymer Polyisocyanate Crosslinker Acrylic Polyol | Example 5 Prepolymer Polyisocyanate Crosslinker Polyester Polyol |
|---|---|---|---|
| Set time (hours) | 1 | 0.5 | 2 |
| Dry hard (hours) | 13.5 | 3.5 | 3 |
| Pencil Hardness | HB | HB | HB |
| Dry Adhesion (ASTM D3359) | 4A | 4A | 4A |
| Wet Adhesion (24 h, D3359) | 4A | 4A | 4A |
| Impact (D/R in-lb.) | 160/160 | 160/160 | 160/160 |
| MEK rubs | 100+ | 100+ | 100+ |
| 60° Gloss | 94.7 | 92.6 | 95.3 |
| Gloss Retention (1000 h, UV-B313) | 88% | 92% | 97% |

It is important to note that the handling of the isocyanurate/acrylic polyol conventional or control formulation was much more difficult than was the prepolymer/ isocyanurate crosslinker based formulation of Examples 3 and 5. Furthermore, the conventional or control formulation had to be formulated at 2.5:1 volume parts isocyanurate to polyol, i.e., a non-integer mix ratio, and the control demonstrated an extreme sensitivity to catalyst level.

EXAMPLE 7 Catalyst Sensitivity Studies

Catalyst sensitivity studies were conducted on Examples 1,2 and 5. The results are shown in Table 8.

TABLE 8

CATALYST LEVEL SENSITIVITY STUDY
(ACRYLIC FORMULATIONS)

| Catalyst Level | set time hr | tack time | dry hard | pot life hr | gel time |
|---|---|---|---|---|---|
| Example 1 | | | | | |
| none | 5 | 16 | 20 | 0.75 | 5942 |
| 1/2 x | 0.75 | 1.25 | 6 | 0.25 | 182 |
| x | 0.17 | 0.5 | 3 | 0.17 | 83 |
| Example 2 | | | | | |
| none | 6.5 | 24 | 48 | 3 | 7763 |
| 1/2 x | 3 | 13 | 24 | 1.17 | 4715 |
| x | 3 | 8 | 22 | 0.67 | 2304 |
| 2 x | 1.5 | 3 | 9 | 0.33 | 871 |
| Example 5 | | | | | |
| none | 16 | 34 | 48 | 3 | 8347 |
| 1/2 x | 1 | 2 | 6 | 0.5 | 1139 |
| x | 0.5 | 1 | 4 | 0.5 | 632 |

The above results show that the Example 5 formulation, even though a polyester polyol was used, with no catalyst the pot life and dry times resembled the prior art prepolymer formulations (Example 2). On the other hand, with added catalyst the Example 5 sample showed very fast dry times with reasonable pot lives.

What is claimed is:

1. An isocyanate mixture suited for producing polyurethane coatings which comprises:

(a) from about 10 to 90 weight parts of a prepolymer comprising the reaction product of a diisocyanate component and a long chain polyol component having an average hydroxyl functionality greater than 2.0, said prepolymer having an equivalent weight from about 250 to 2000 grams per equivalent, an unreacted diisocyanate monomer content of less than about 1% by weight, and a molar concentration of oligomers of less than 15%; and, (b) from about 10 to 90 weight parts of a polyisocyanate crosslinker selected from the group consisting of an adduct of an aliphatic or aromatic diisocyanate and an aliphatic polyol, an isocyanurate of an aliphatic or aromatic diisocyanate, a biuret of an aliphatic or aromatic diisocyanate, a uretdione of an aliphatic or aromatic diisocyanate, an allophanate of an aliphatic or aromatic diisocyanate or mixture of the same, the isocyanate mixture totaling 100 weight parts.

2. The isocyanate mixture of claim 1 wherein the diisocyanate utilized in forming said prepolymer and said low viscosity polyisocyanate crosslinker is selected from the group consisting of isophorone diisocyanate, hexamethylenediisocyanate, tetramethylxylyl diisocyanate, bis(4-isocyanatocyclohexyl)methane.

3. The isocyanate mixture of claim 2 wherein the long chain polyol used to form said prepolymer is a polyether or polyester polyol.

4. The isocyanate mixture of claim 3, wherein the long chain polyol component is a blend of a polyether or polyester polyol and a short chain multifunctional polyol.

5. The isocyanate mixture of claim 2 wherein the long chain polyol is a polyether polyol selected from the group consisting of poly(ethylene oxide)polyols, poly(propylene oxide)polyols, and poly(butylene oxide)polyols or a combination of the same.

6. The isocyanate mixture of claim 4 wherein the aliphatic diisocyanate used to prepare said prepolymer is isophorone diisocyanate and said low viscosity polyisocyanate crosslinker is an isocyanurate or uretdione of hexamethylene diisocyanate.

7. The isocyanate mixture of claim 6 wherein the isocyanate mixture comprises from 40:60 to 60:40 weight parts of said prepolymer to said polyisocyanate crosslinker, said isocyanate mixture totaling 100 weight parts.

* * * * *